United States Patent [19]

Yoshino et al.

[11] Patent Number: 5,615,106
[45] Date of Patent: Mar. 25, 1997

[54] CONTROL DEVICE

[75] Inventors: Tooru Yoshino, Yokohama; Akihiro Ishiwata, Kawasaki; Eiji Miyamura, Ohta-ku, all of Japan

[73] Assignee: RKC Instrument, Inc., Tokyo, Japan

[21] Appl. No.: 501,570

[22] Filed: Jul. 12, 1995

[30] Foreign Application Priority Data

Jul. 12, 1994 [JP] Japan .................................. 6-181997

[51] Int. Cl.⁶ ............................. G06F 19/00; G06F 13/10
[52] U.S. Cl. ........................ 364/140; 364/138; 395/829
[58] Field of Search .................................. 364/133, 140, 364/141, 138; 340/825.06, 825.07, 825.52; 395/829, 892, 830

[56] References Cited

U.S. PATENT DOCUMENTS

| | | | |
|---|---|---|---|
| 4,910,658 | 3/1990 | Dudash et al. | 364/138 |
| 4,922,410 | 5/1990 | Morikawa et al. | 364/200 |
| 5,301,276 | 4/1994 | Kimura | 395/275 |
| 5,437,019 | 7/1995 | Brockmann | 395/400 |
| 5,495,421 | 2/1996 | Hidding | 364/478.01 |

FOREIGN PATENT DOCUMENTS 2-261297  10/1990  Japan .
3-16341   1/1991   Japan .

*Primary Examiner*—Joseph Ruggiero
*Attorney, Agent, or Firm*—Foley & Lardner

[57] ABSTRACT

In a control device, comprising a plurality of base components connected to one another in series by a composite signal line including a plurality of address signal lines, a control unit fitted onto one of said base components, and a plurality of controlled units adapted to be controlled by said control unit and each fitted onto a selected different one of the remaining base components, the control unit selects one of the address signal lines in the composite signal line, and produces an address signal thereon. The base components associated with the controlled units are provided with respective terminators each corresponding to one of the address signal lines, and these terminators are connected to the corresponding controlled units while the remaining address signal lines are simply passed on. Thereby, the addresses of controlled units are allowed to be automatically set up by the control unit. Thus, the initializing step involving the determination of addresses for the controlled units can be carded out simply and with a reduced possibility of errors. Also, the base components may have an identical structure, and this contributes to the simplification of the handling and the reduction in the fabrication cost.

7 Claims, 4 Drawing Sheets

5,615,106

CONTROL DEVICE

TECHNICAL FIELD

The present invention relates to a control device, and in particular to a control device having a plurality of mutually independent base components connected in multiple stages and each adapted to be fitted with a main control unit or a controlled unit controlled by the main control unit. The present invention is particularly related to a control device of this type which is adapted to automatically set up addresses of the controlled units.

BACKGROUND OF THE INVENTION

As illustrated in FIG. 4, the control device of this type typically includes a base unit 9 incorporated with a plurality of slots 1, 3, 5, 7, . . . which are mutually connected by a composite signal line (which is not shown in FIG. 4), and the user may install a plurality of input/output units (controlled units) 15, 17, . . . as well as a power unit 11 and a CPU unit 13 serving as a main control unit into the slots 1–7, . . . . In the drawing, numerals 19a–19d denote connecting terminals provided in the slots 1–7, . . . for electric connection with the corresponding units 11 –17, . . . .

In this control device, with electric power from the power source unit 11 supplied to the other units 15–17, . . . , the CPU unit 13 controls the individual input/output units 15, 17, . . . by designating addresses. For instance, according to temperature values obtained from the input/output units 15, 17, . . . the CPU unit 13 determines a certain procedure and computes control values, and forwards such data to the object to be controlled (not shown in the drawings) to control the temperature of the object to be controlled according to a fixed set point control mode or a programmed control mode.

According to such a control device, typically, the slots 1–7, . . . are provided in the base unit 9 by a number greater than normally needed so that the user may add or remove the input/output units 15–17, . . . having different functions according to each particular need.

Therefore, it is necessary to allocate unique addresses to the input/output units 15, 17 . . . when or before they are installed into the individual slots 5, 7 . . . for the CPU unit 13 to be able to accurately control the input/output units 15, 17 . . . by specifying them by their addresses.

Conventionally, address allocation terminals and dip switches (which are both not shown in the drawing) were provided in the circuit board or the like of each input/output unit 15, 17, . . . and the terminals were connected by jumper wires or the dip switches were manually operated according to the type of each particular input/output unit 15, 17 . . . . Thus, different addresses were manually allocated to different input/output units by the user so as to avoid any repetitions in the address allocation and not to cause any confusion as to the types and the functions of the units. For instance, "1"–"5" may be allocated to digital input/output units, and "6"–"9" may be allocated to analog input/output units.

However, allocating addresses to different input/output units 15, 17, . . . by using jumper wires and dip switches involves a highly laborious work for the user, and address allocation may not be correctly carried out, thereby resulting in the failure of the control device to operate properly.

Some of the recently developed small control devices allow a desired number of independent base components each incorporated with a slot to be installed on rails or the like so that the user can install input/output units into any of these base components according to his need. In regard to such an arrangement also, it has been desired to be able to allocate addresses to the input/output units without altering the hardware of the base unit for the convenience of both fabrication and handling.

It thus has been desired to provide a control device which uses independent base components and does away with the arrangement for address allocation so as to reduce the effort required by the user. The inventors have therefore directed their attentions to the individual base components for connecting various input/output units, and have developed a control device which can reduce the effort required by the user for setting up addresses.

BRIEF SUMMARY OF THE INVENTION

In view of such a recognition by the inventors, and the problems associated with the prior art, a primary object of the present invention is to provide a control device, comprising a plurality of base components connected to one another in series by a composite signal line including a plurality of address signal lines, a control unit fitted onto one of said base components, and a plurality of controlled units adapted to be controlled by said control unit and each fitted onto a selected different one of the remaining base components, which allows the addresses of the controlled units to be allocated easily.

A second object of the present invention is to provide a control device of this type which allows the addresses of the controlled units to be allocated with a reduced possibility of errors.

A third object of the present invention is to provide a control device of tiffs type which allows the addresses of the controlled units to be allocated automatically.

A fourth object of the present invention is to provide a control device of this type which allows the addresses of the controlled units to be allocated automatically by using a structure which is simple and economical to manufacture.

According to the present invention, these and other objects can be accomplished by providing a control device, comprising: a plurality of base components connected, to one another in series by a composite signal line including a plurality of address signal lines; a control unit fitted onto one of the base components; a plurality of controlled units adapted to be controlled by the control unit and each fitted onto a selected different one of the remaining base components; an address signal terminator provided in each of the base components for terminating a different one of the address signal lines, and connected to the controlled unit fitted on the associated base component; and a controller provided in the control unit for selecting each of the address signal lines to assign an address to the controlled unit associated with the base component at which the selected address signal line is terminated by the corresponding address signal terminator, and assigning a unique address to the controlled unit.

According to the present invention, when the controller of the control unit has selected one of the address signal lines, and the corresponding address signal is produced on the selected address signal line, the address signal is received by the controlled unit which is connected to the base component assigned with the address signal terminator for the address signal on which the address signal is produced while the address signals carried by the remaining address signal lines which are not terminated at the base component for this controlled unit simply pass through the base component.

Typically, the controller is adapted to sequentially scan all of the address signal lines to assign unique addresses to all of the controlled units fitted onto the base components, and to skip those base components onto which no controlled units are fitted, typically when no address confirmation signal is returned to the controller of the control unit. The composite signal line may comprise a data signal line and a control signal line, and the address confirmation signal may be carried, for instance, by the data signal line.

The allocation of addresses to the controlled units may be carried out either as an initial setup or whenever any change is made to the control device. The allocation of addresses can be manually selected, but, more conveniently, may be initiated upon power up. It may be repeated at every power up, but by storing the already determined addresses, it is possible to avoid repeating it by conducting allocation of addresses to the controlled unit only when the stored data on the addresses of the controlled unit disagree with data obtained at each start tip.

According to a preferred embodiment of the present invention, each of the base components is provided with input means and output means each including a plurality of connecting terminals, and the address signal lines are connected to the connecting terminals so as to extend through the base components with each of the address signal lines terminating at a different one of the base components. Preferably, the connecting terminals of each of the input means are internally connected to the connecting terminals of the output means in the same base component offset by one connecting terminal so that an internal connection between the input means and the output means may be identical for substantially all of the base components, whereby the base components, being identical, can be fabricated more easily and more economically.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
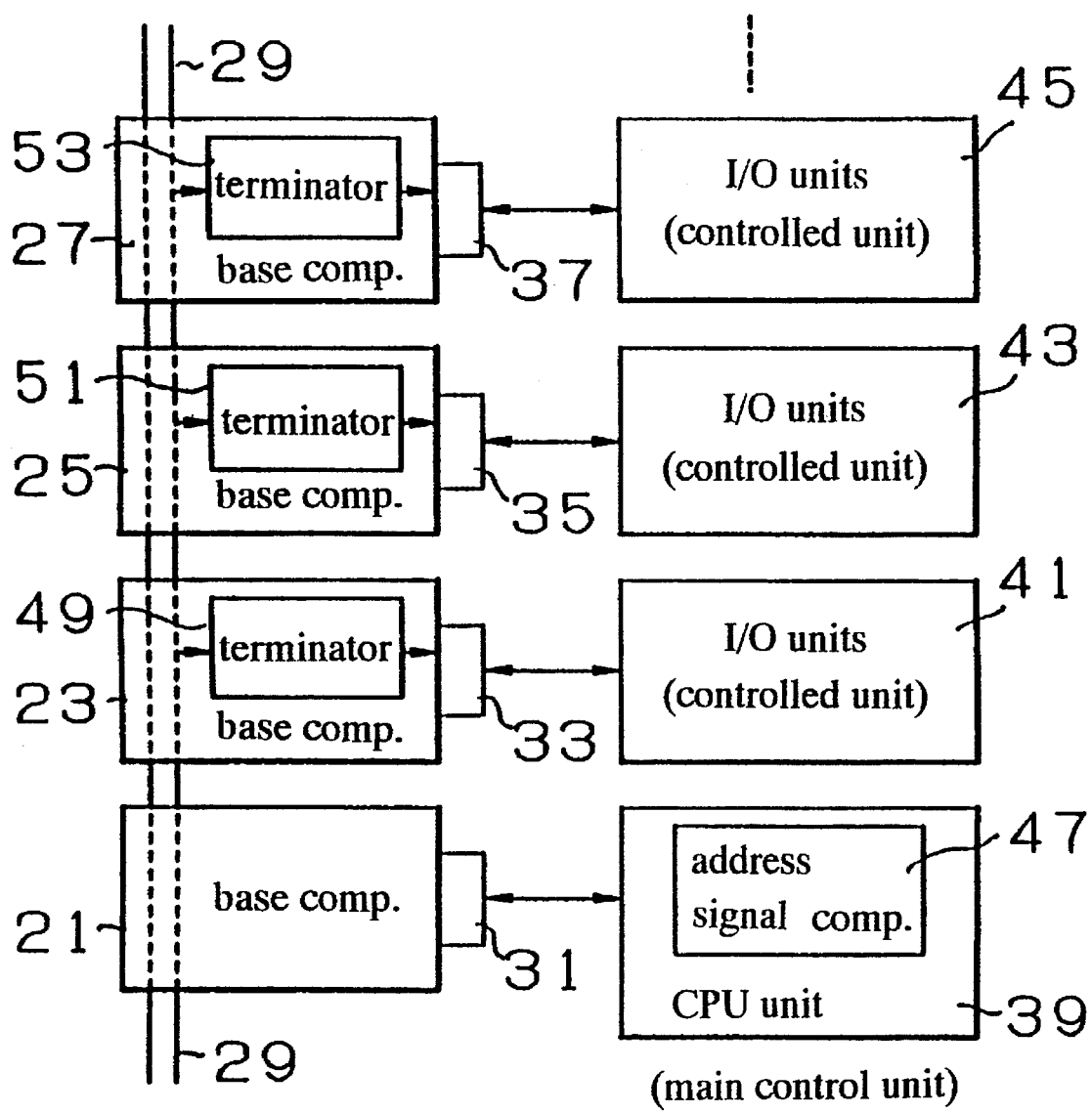
FIG. 1 is a schematic block diagram showing a preferred embodiment of the control device according to the present invention.

Referring to FIG. 1 which is a schematic block diagram of an embodiment of the control device according to the present invention, base components 21, 23, 25, 27, ... are formed independent from each other, and connected in tandem into a plurality of stages by a composite signal line 29 consisting of a multi-axial cable including a power line for supplying electric power, data signal lines for transmitting data signals as serial signals, and an address signal line for designating addresses.

As a practical product, the control device is preferably formed by a plurality of base components 21~27, ... which are arranged by being mounted on rails not shown in the drawing, and electrically and mechanically connected with each other by connectors provided in the base components 21~27, ... although they are not shown in the drawing. In such a structure, the connectors or other terminals play the role of the composite signal line 29. The base components 21~27, ... are provided with slots 31, 33, 35, 37, ... and electric power is supplied from the composite signal line 29 to the respective units 39, 41, 43, 45, ... via associated slots while signals are exchanged between the individual units and the composite signal line 29.

The base component 21 is connected to a main control unit consisting of, for instance, a CPU unit 39, and the remaining base components 23~27, ... are connected to controlled units consisting of, for instance, input/output units 41~45, ... The CPU unit 39 controls the individual input/output units 41~45, ... by designating their addresses and controlling them, and according to the measured temperature values obtained by the input/output units 41~45, ... , determines the control procedures and computes the control values, exchanges measured data and pre-defined data with external equipment such as a host computer, and transmits data to the input/output units. The CPU unit 39 is further provided with an address signal component 47 for selecting one of the plurality of address lines 61 and producing an address signal from the base component 21 in a sequential manner to designate the addresses of the individual input/output units 41~45, ... The details thereof will be described hereinafter.

The input/output units 41~45, ... operate under the command of the CPU unit 39, and execute computing processes on the measured temperature values supplied thereto, forward the measured data and control values based thereon to the CPU unit 39, and supply the results of the computing processes to external equipment. Additionally, when address signals are received via the slots 33~37, ... , on the condition that the addresses of the corresponding input/output units 41 ~45, ... are yet to be defined, the input/output units 41~45, ... are given with the function of defining the addresses by themselves and forwarding address confirmation signals to the CPU unit 39. The details thereof will be described hereinafter.

The base components 23~27, ... to which the input/output units 41~45, ... are connected are each formed with an address signal terminator 49, 51, 53, ... for a corresponding one of the address signal lines 61, and these address signal terminators 49~53, ... are connected only to the associated slots 33~37, ... while allowing other address signals to be passed on. In other words, the address signal lines 61 connected to the address signal terminators 49~53, ... are terminated at the corresponding base components 23~27, ... and are simply passed on through the other base components 23~27, ....

In FIG. 1, for the convenience of illustration, the CPU unit 39 and the input/outputs units 41~45, ... are illustrated as if being separated from the slots 31~37, ... and only four of the base components 21~27, ... and only three of the input/output units 41~45, ... are illustrated, but the present invention is not limited by these numbers. The power unit, the base component connected thereto and the associated connectors are omitted from the drawings as they are not essential to the present invention. The same is true with the remaining part of the description and the drawings.

The details of the control device according to the present invention are now described in the following with reference to FIGS. 2 and 3.

Figure 2:
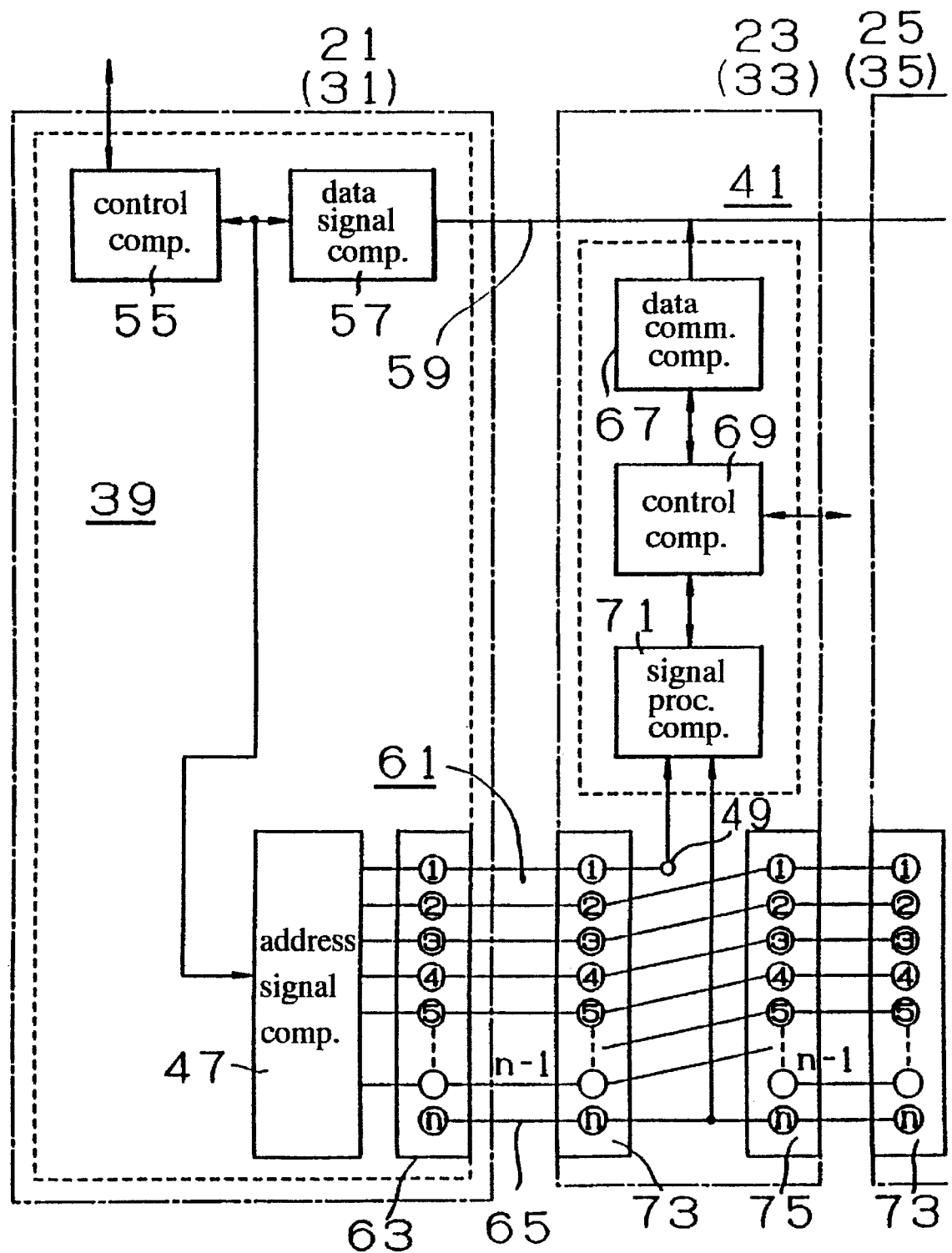
FIGS. 2 and 3 are more detailed block diagrams showing different parts of the control unit of FIG 1.
Figure 3:
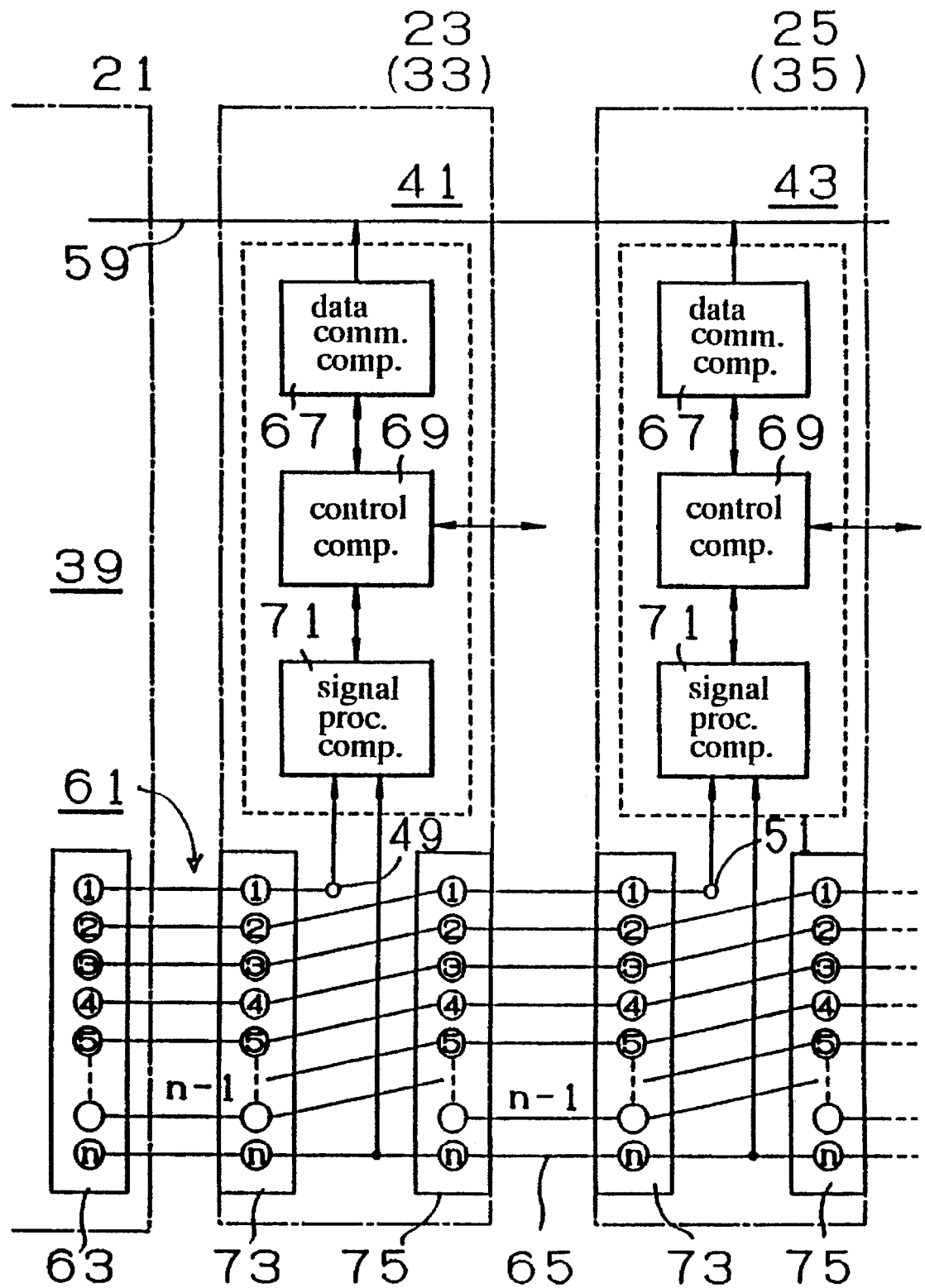
Figure 4:
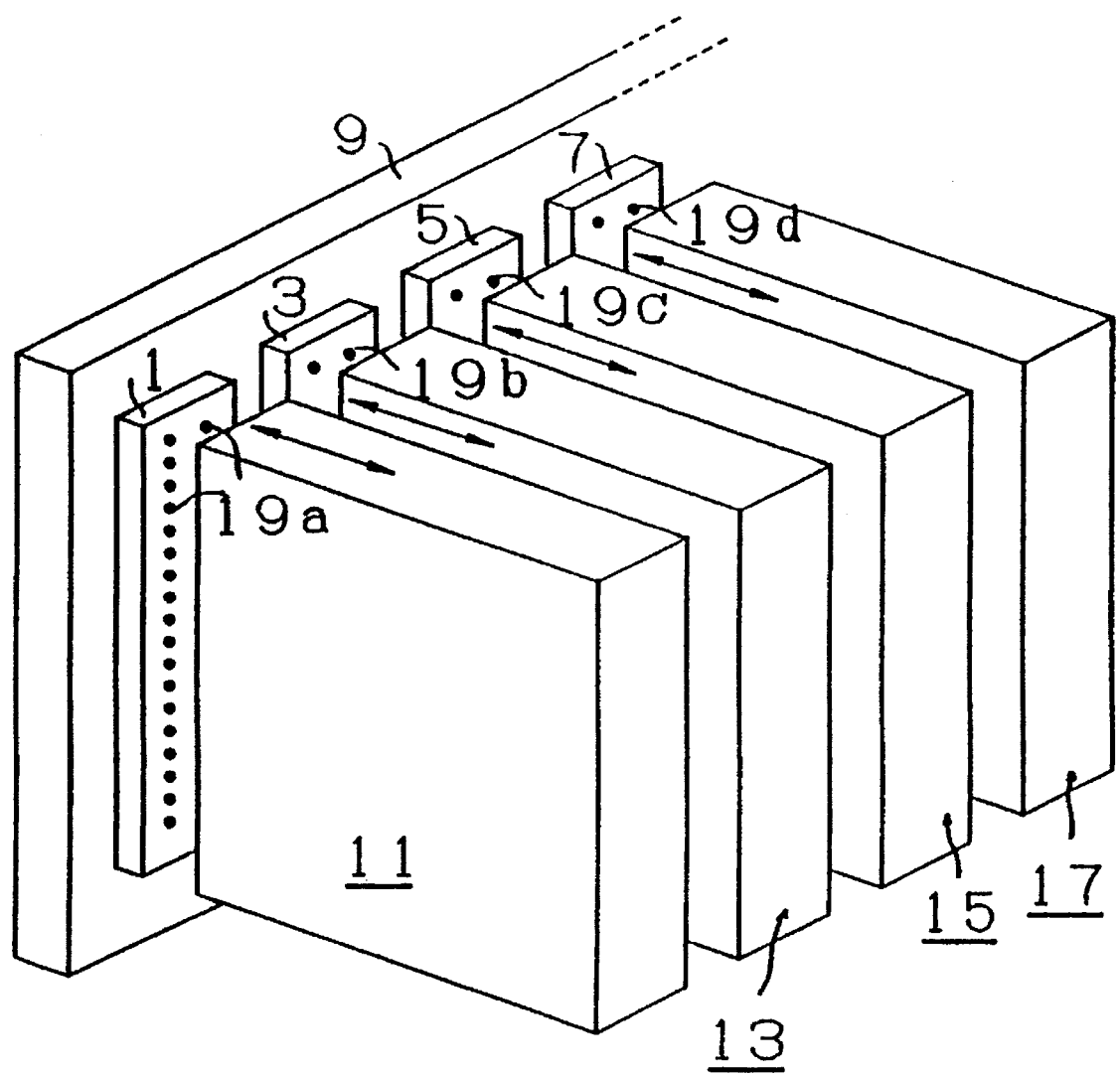
FIG. 4 is a perspective view showing a conventional control device.

FIGS. 2 and 3 are block diagrams showing the relationship between the CPU unit 39 and the input/output units 41~45, ... connected to the slots 31~37, ... of the base components 21–27, . . . For the convenience of illustration, FIG. 2 mainly shows the CPU unit 39 and the input/output unit 41, and FIG. 3 mainly shows the input/output units 41 and 43 with the remaining input/output units 45, . . . omitted from the drawings. The input/output units 41–45, . . . all have a substantially identical structure.

Referring to FIG. 2, the CPU unit 39 connected to the slot 31 of the base component 21 includes a control component 55, and a data signal component 57 and an address signal component 47 connected thereto. The data signal component 57 is an interface for regulating the timing in exchanging data signals between the data signal lines 59 of the composite signal line 29 (which is omitted in FIGS. 2 and 3) and the control component 55.

The address signal component 47 is an interface for selecting one of the address signal lines 61 of the composite signal line 29, and supplying an address signal consisting of an H or L level signal under the command of the control component 55, and is connected to an output terminal 63 consisting of a plurality of connecting terminals indicated as first (indicated by numeral 1 in a circle) through (n-1)-th (indicated simply by an empty circle) terminals and arranged, for instance, in a single row. The address signal component 47 also produces control signals such as reset signals and data request signals for controlling the input/output units 41–45, . . . from the n-th terminal (indicated by n placed inside a circle).

The control component 55 comprises a CPU for carrying out the primary control action of the CPU unit 39, ROM for storing system programs that are to be executed in the CPU unit 39, and RAM for temporarily storing data produced during the execution of the programs, but details thereof are not described in this disclosure as they are not essential to the description of the present invention.

The control component 55 carries out basic determination and computing functions of the control device such as computing control values according to data such as measured temperature values from the input/output units 41–45, . . . received via the data signal lines 59 and the data signal components 57, forwarding the computed control values to the data signal lines 59 via the data signal components 57 as well as to external equipment, and indicating various input operations. The control component 55 has additional functions as described in the following.

The control component 55 controls the output of address signals by selecting address signal lines 61 from the address signal component 47 upon power up or upon receipt of an address designation signal from external equipment at an arbitrary time point, and supplies address signals by selecting other address signal lines upon receipt of address confirmation signals from the input/output units 41–45, . . . via the data signal component 57 and repeat this process until address signals have been forwarded to all of the address signal lines.

The timings upon which the control component 55 clears the address designation in the input/output units 41–45, . . . with reset signals form the control signal line 65, and designates addresses via the address signal component 47 include the power up and a key entry at an arbitrary time point during operation. The data signal lines 59 and the control signals lines 65 are indicated as if each consisting of a single line in FIGS. 2 and 3, but typically each consist of a plurality of lines.

The input/output unit 41 connected to the slot 33 of the base component 23 consists of a data communication component 67 connected to the data signal lines 59, a control component 69 connected thereto, a signal processing component 71 connected thereto, an address signal terminator 49, and input and output terminals 73 and 75.

The data communication component 67 operates under the command of the control component 69, and upon receipt of a data signal accompanied by an address forwarded from the CPU unit 39, on the condition that this address agrees with the address registered with the input/output unit 41, receives this data signal, and forwards an address confirmation signal to the data signal lines 59.

The control component 69 comprises a CPU, and a ROM storing system programs for this CPU (which are not shown in the drawings), and performs functions different from those of the CPU unit 39. More specifically, the control component 69 performs the functions of exchanging data signals with external equipment not shown in the drawings, computing control values according to obtained data such as measured temperature data to forward them to the CPU unit 39 as display data, as well as the basic functions as an input/output unit.

The control component 69 stores the address of the input/output unit 41, and produces an address confirmation signal via the data communication component 67 when an address is allocated to the input/output unit 41. The address confirmation signal may be returned to the control component 55 of the CPU unit 39 via the data signal line 59, for instance.

The signal processing component 71 operates under the command of the control component 69, and performs the functions of clearing the address designation of the control component 69 when a reset signal is received from the control signal line 65, stores an address in the control component 69 when the address signal is supplied from the address signal terminator 49 without any address allocated thereto, and receiving a control signal such as a data request signal from the control signal line 65 to forward it to the control component 69.

The input terminal 73 of the base component 23 consists of first (indicated by numeral 1 surrounded by a circle) through (n-1)-th (indicated simply by an empty circle) terminals which are arranged in a single row similarly to the output terminal 63 of the base component 21, and are connected to the output terminal 63 either directly or via a multi-core cable. The first connecting terminal (numeral 1 surrounded by a circle) is connected to the signal processing component 71 via the address signal terminator 49. The address signal terminator 49 may also consist of the first connecting terminal itself.

The output terminal 75 of the base component 23 consists of first (indicated by numeral 1 surrounded by a circle) through (n-1)-th (indicated simply by an empty circle) terminals which are arranged in a single row similarly to the output terminal 63 of the base component 21, and are internally connected to the input terminal 73 with the second terminal (indicated by numeral 2 surrounded by a circle) and the succeeding terminals of the input terminal 73 of the base component 23 connected to the first connecting terminal (indicated by numeral 2 surrounded by a circle) and the succeeding terminals of output terminal 75 of the base component 23 with the numbers shifted by one. More specifically, the input terminal 73 connected to the preceding stage is internally connected to the output terminal 75 connected to the succeeding stage with a shifting in an either upward or downward direction. For instance, the second, third and fourth connecting terminals 2, 3 and 4 of the input terminal 73 are connected to the first, second and third connecting terminals 1, 2 and 3 of the output terminal 75 in a shifted relationship.

As illustrated in FIG. 3, the input/output unit 41 is connected in series with the input/output unit 43 and the succeeding input/output units 43, . . . via the input and output terminals 73 and 75. It should noted, however, that the functions of the data communication component 67 and the control component 69 of each of the input/output units 41, 43 are different from those of other input/output units.

In the arrangement where the base components 21, 23 of the CPU unit 39 and the input/output units 41, . . . are directly connected with each other, the output terminals 63 and 75 and the input terminal 73 are adapted to be fit one into another.

The data signal lines 59 are illustrated separately from the output terminals 63 and 75 and the input terminal 73 in FIGS. 2 and 3, but are connected via these terminals in the actual commercial products.

The operation of the control device according to the present invention is briefly described in the following.

The power is turned on with the base components 21~27, . . . connected in parallel, the CPU unit 39 connected to the slot 31 of the base component 21, the input/output units 41~45, . . . and the power unit connected to the slots 33~37, . . . of the base components 23~27, . . . .

Upon power up, the CPU unit 39 controls the address signal component 47 via the control component 55, and produces an address signal by selecting the address signal line of the first connecting terminal 1 of the output terminal 63 among the plurality of address signal lines to select one of the input/output units 41~45, . . . .

The address signal is supplied to the signal processing component 71 from the address signal terminator 49 of the base component 23 of the input/output unit 41 nearest to the CPU unit 39, and an address is set up on the control component 69 while an address confirmation signal is forwarded to the CPU unit 39 via the control component 69, the data communication component 67 and the data signal lines 59 to be stored in the CPU unit 39.

In this conjunction, at the output terminal 63 of the CPU unit 39, the address signal lines connected to the second through (n-1)-th connecting terminals pass through the input/output unit 41 without being connected thereto, but as no address signal is produced, no addresses are set up on the other input/output units 43~45, . . . .

When the CPU unit 39 has produced an address signal by controlling the address signal component 47 and selecting the address signal line 61 of the second connecting terminal 2 of the output terminal 63, the address signal passes through the input/output unit 41 and designates an address by being received by the signal processing component 71 from the address signal terminator 51 of the next input/output unit 43. This process is thereafter repeated sequentially until address signals are supplied to all of the address signal lines.

When no address confirmation signal is forwarded to the CPU unit 39 after a certain time period has elapsed, it is then determined that the corresponding input/output unit is not installed, and the next address signal is produced.

After address signals are supplied to all of the address signal lines 61, the CPU unit 39 stores the number of the input/output units 41~45, . . . , their arrangement and their functions according to the address confirmation signals.

In this manner, the control device of the present invention has the address signal component 47 in the CPU unit 39, and one of the address signal lines is terminated at each of the base components 23~27, . . . of the input/output units 41~45, . . . while the remaining address signal lines are simply passed through this base component. Therefore, by producing an address signal on a selected one of the address signal lines from the CPU unit 39 via the address signal component 47, the address is automatically received by the corresponding one of the input/output units 41~45, . . . terminating the address signal line at its address signal terminator 49, 51, 53. Therefore, by sequentially selecting the address signal lines 61, it is possible to automatically set up unique addresses to all of the connected input/output units 41~45, . . . .

Thus, the setting up of the addresses of the input/output units 41~45, . . . is simplified, and the possibility of making errors in setting up addresses when newly installing the input/output units 41~45, . . . or adding input/output units can be minimized. Setting up addresses of a large number of input/output units 41~45 can be easily carried out.

Furthermore, as there is no need for the input/output units 41~45, . . . to compute or compare the pre-defined addresses and the contents of the addresses from the CPU unit 39, no software for comparison is needed to be installed in the input/output units 41~45, . . . , and the overall structure is simplified.

Since the input and output terminals 73 and 75 of the base components 23~27, . . . of the input/output units 41~45, . . . have an identical structure from one input/output unit to another, the base components 23~27, . . . may all have an identical structure so that the fabrication process can be simplified, and the fabrication cost can be reduced.

Since the first connecting terminal 1 at one end of the input terminal 73 of each of the base components 23~27, . . . is either the address signal terminator 49, 51, 53, . . . itself or connected thereto, the input/output units 41~45, . . . may be fabricated as being already connected only with the first connecting terminal 1 at one end of the input terminal 73 while the output terminal 75 is connected to the input terminal 73 with an offset by one connecting terminal. Thus, the fabrication process and the structure of the input/output units 41~45, . . . can be simplified, and the order of connecting the input/output units 41~45, . . . can be arbitrarily selected. It is possible to designate addresses in the order of nearness to the CPU unit 39.

The input and output terminals 63, 73, 75, . . . were provided in the base components 21~27, . . . for connecting the CPU unit 39 and the input/output units 41~45, . . . in the above described embodiment, but the input and output terminals 63, 73, 75, . . . are not essential to the present invention, and the present invention can be implemented as long as an address signal terminator 49, 53, . . . is provided in each of the input/output units. Furthermore, it includes the case in which the address signal terminal 49, ~53, . . . consists of the input terminal 73 itself.

The control device of the present invention can be constructed in such a manner that the CPU unit 39 carries out the address confirmation action upon second power up onward, and compares it with the contents of the functions stored in the control component 55 so that the operator may be notified by a display device or the like not shown in the drawing in case of disagreement due to the change in the configuration of the system.

Thus, according to the present invention, in a control device having a plurality of base components connected to one another by a composite signal line including a plurality of address signal lines into a plurality of stages, and a control unit and controlled units connected to the base components, the control unit is provided with an address signal component for producing an address signal from the base component by selecting one of the address signal lines, and the base components to which the controlled units are connected are each provided with an address signal terminator which terminates one of the address signal lines and is connected only to the corresponding controlled unit while the remaining address signal lines are simply passed through this base component. Thus, simply by selecting one of the address signal lines from the control unit, the controlled unit connected to the base component having a terminator corresponding to the selected signal line is automatically assigned with an address.

Therefore, as opposed to the prior art, without using any address jumper lines or dip switches, the user can set up addresses on a large number of controlled units easily with a reduced possibility of making errors so that the initial setup and diagnosis can be simplified.

According to the structure in which each of the base components to which the controlled units are connected is provided with an input terminal and an output terminal for the address signal lines, one element of the input terminal consisting of the address signal terminator, the base units for different controlled units may consist of an identical structure, and the fabrication of each base unit can be made both easy and economical.

According to the structure in which an end of the input terminal consists of the address signal terminator, and the remaining address signal lines from the input terminal are connected to the output terminal with an offset toward the end corresponding to the address signal terminator provided at the output terminal, the connecting structure between the base component and the controlled unit and the structure for the base component itself can be standardized, and the structure and the fabrication process of the control device can be made even more simpler with the added advantage of allowing the placement of the controlled units to be arbitrarily selected.

Although the present invention has been described in terms of a preferred embodiment thereof, it is obvious to a person skilled in the art that various alterations and modifications are possible without departing from the scope of the present invention which is set forth in the appended claims.

What we claim is:

1. A control device, comprising:

a plurality of base components connected to one another in series by a composite signal line including a plurality of address signal lines;

a control unit fitted onto one of said base components;

a plurality of controlled units adapted to be controlled by said control unit and each fitted onto a selected different one of the remaining base components;

an address signal terminator provided in each of said base components for terminating a different one of said address signal lines, and connected to the controlled unit fitted on the associated base component; and a controller provided in said control unit for selecting each of said address signal lines to assign an address to the controlled unit associated with the base component at which said selected address signal line is terminated by the corresponding address signal terminator, and assigning a unique address to said controlled unit.

2. A control device according to claim 1, wherein said controller is adapted to sequentially scan all of said address signal lines to assign unique addresses to all of said controlled units fitted onto said base components, and to skip those base components onto which no controlled units are fitted.

3. A control device according to claim 1, wherein each of said base components is provided with input means and output means each including a plurality of connecting terminals, and said address signal lines are connected to said connecting terminals so as to extend through said base components with each of said address signal lines terminating at a different one of said base components.

4. A control device according to claim 2, wherein the connecting terminals of each of said input means are internally connected to the connecting terminals of the output means in the same base component offset by one connecting terminal so that an internal connection between said input means and said output means may be identical for substantially all of said base components.

5. A control device according to claim 1, wherein said controller of said control unit determines addresses of said controlled units upon first power up of said control device.

6. A control device according to claim 5, wherein said controller of said control unit determines addresses of said controlled units upon each subsequent power up of said control device.

7. A control device according to claim 1, wherein said controller of said control unit is provided with storage means for storing data on the determined addresses of said controlled unit, and redefining addresses of said controlled units when said data disagree with actually detected addresses of the controlled units upon power up of said control device.

* * * * *